March 17, 1959
R. W. WILSON
2,878,025
HIGHWAY MARKING APPARATUS
Filed May 23, 1956
2 Sheets-Sheet 1
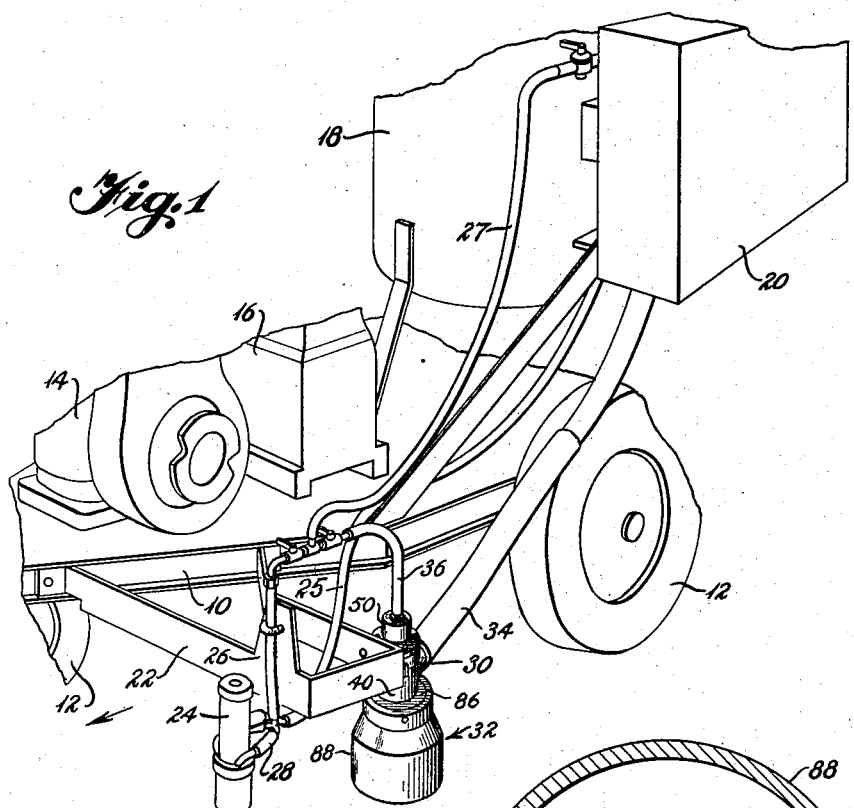
Fig.1
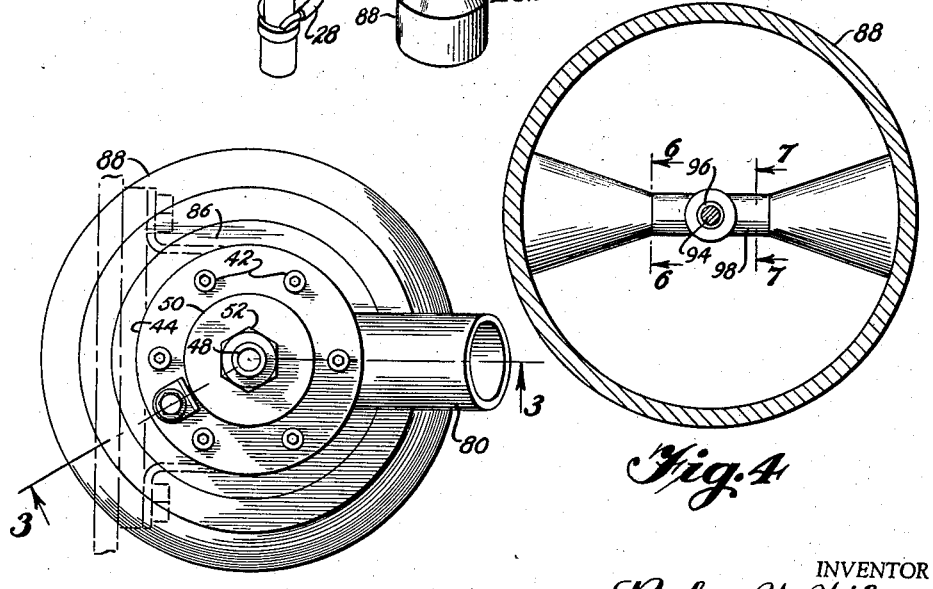
Fig.2
Fig.4
INVENTOR
Rufus W. Wilson
BY Karl W. Flocks
ATTORNEY

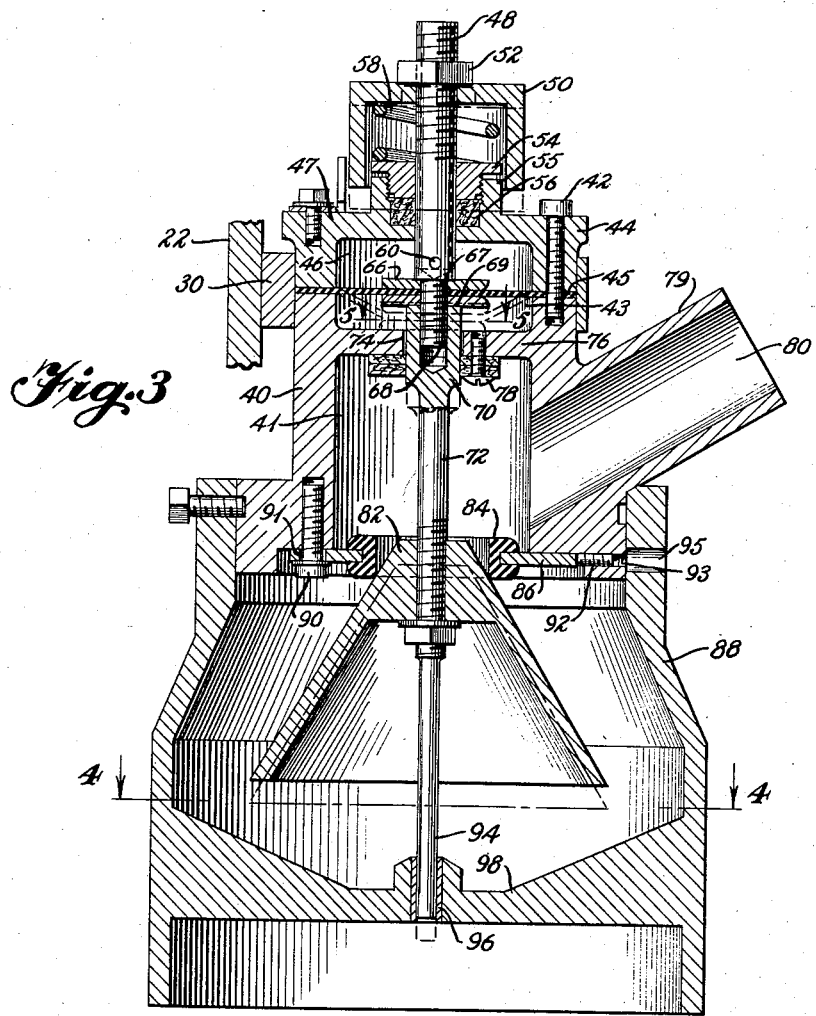
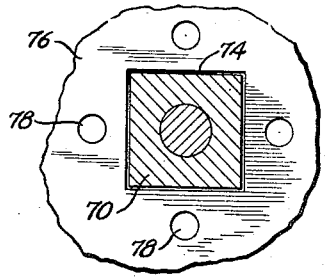
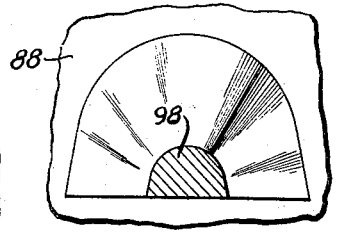
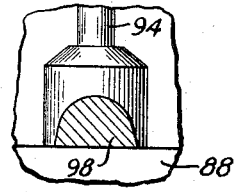

United States Patent Office 2,878,025
Patented Mar. 17, 1959

2,878,025
HIGHWAY MARKING APPARATUS
Rufus W. Wilson, Huntingdon, Pa., assignor to Wald Industries, Inc., Huntingdon, Pa., a corporation of Pennsylvania Application May 23, 1956, Serial No. 586,741
13 Claims. (Cl. 275—2)

The present invention relates to highway marking apparatus. More particularly, the present invention relates to a glass bead dispenser that is adapted to uniformly distributed glass beads or spheres on a freshly applied roadway marking, thereby forming a reflectorized traffic stripe on the roadway.

In the application of traffic lines to highways, it is generally desirable to apply a reflectorized material in the form of small glass spheres or beads to the highway stripe for increasing night-time visibility and further extending the life of the stripe. The small glass beads may be applied with the paint binder in a single operation or an alternative method of application is to apply the paint binder separately and then immediately follow the paint binder with an application of the small glass beads thereon.

Prior to the instant invention, the heretofore known striping apparatus for individually applying the paint binder and glass beads has either been of the self-propelled variety or that type of machine connected to a towing vehicle. The bead dispenser was normally mounted on the striping machine so that it was positioned rearwardly of the paint gun with respect to the direction of travel. Thus, a paint line was applied to the surface to be marked and the beads were then applied directly on the freshly painted line or stripe. In order to uniformly distribute the glass beads on the paint stripe it has been necessary to position the glass bead dispenser in close proximity to the surface being striped. However, the heretofore known bead dispensers which were large and bulky could not be satisfactorily utilized with the known striping machines in such position.

It has also been found that in the heretofore known striping apparatus, the conical valve employed for distributing the glass beads had a tendency to become eccentric with respect to the seat thereof and this eccentricity frequently resulted in a non-uniform distribution of the beads and an unnecessary loss of the beads when the dispensing operation had discontinued.

In one form of the heretofore known bead dispenser, the rate of travel of the striping machine was limited due to the unequal distribution of the beads at speeds greater than five miles per hour. Other forms of bead dispensers, although being capable of greater speeds, were limited in application due to the undesirable method of dispensing the beads, thereby resulting in non-uniform distribution thereof.

It is therefore an object of the present invention to provide glass bead dispensing apparatus that is adapted to uniformly distribute the glass beads on a freshly applied paint stripe.

Another object of the present invention is to provide a glass bead dispenser that is adapted to be mounted on a striping machine in close proximity to the surface being marked.

Still another object of the present invention is to provide a glass bead dispenser which incorporates a diaphragm controlled valve that enables the bead dispenser to be located in close proximity to the surface being marked.

Still another object of the present invention is to provide a diaphragm controlled valve for controlling the dispensing of the glass beads that is supported so as to prevent the valve seat from becoming eccentric with respect to the valve.

Still another object of the present invention is to provide a glass bead dispensing apparatus that is adapted to distribute glass beads at a uniform rate and with a uniform distribution thereof on the surface being marked.

Other objects and the nature and advantages of the instant invention will be apparent from the following description taken in conjunction with the accompanying drawings, wherein:

Fig. 1 is a perspective view of a highway marking machine of the self-propelled type, illustrating the location of the bead dispensing apparatus embodied in the present invention mounted thereon;

Fig. 2 is a top plan view of the bead dispensing machine embodied herein and shown particularly in Fig. 3;

Fig. 3 is a vertical sectional view of the bead dispenser taken along the line 3—3 of Fig. 2;

Fig. 4 is a sectional view taken along the line 4—4 of Fig. 3;

Fig. 5 is a sectional view taken along the line 5—5 of Fig. 3;

Fig. 6 is a sectional view taken along the line 6—6 of Fig. 4; and

Fig. 7 is a sectional view taken along the line 7—7 of Fig. 4.

Referring now to the drawings and particularly Fig. 1, a highway marking machine of the self-propelled type is illustrated and includes a frame 10 upon which wheels 12 are rotatably mounted at the front and rear thereof. The marking machine may be of the tri-wheeled type, a small wheel being positioned at the front thereof, and the operator may either walk behind the machine or ride on a rear platform mounted on the rear thereof. Also mounted on the frame 10 is an internal combustion engine 14 for supplying the operating power for the machine and a compressor 16 driven by the engine 14 for supplying the operating air for the dispensing equipment. Mounted rearwardly of the engine 14 and compressor 16 on suitable supports secured to the frame 10 is a receptacle 18 which contains the paint binder. A receptacle 20 is located adjacent the container 18 and contains a supply of small light reflecting beads of glass. Extending outwardly from the frame 10 and secured thereto is a sub-frame assembly 22 that has mounted thereon a paint gun 24. The paint gun 24 communicates with the paint container 18 through a paint conducting conduit 25. The paint gun 24 further communicates with a source of air pressure through lines 26 and 28 which are operatively connected to a flexible air supply hose 27 through a T coupling. The air supply hose 27 is connected to a suitable air control valve within easy reach of the operator. Secured to the sub-frame assembly 22 by a clamping bracket 30 is a glass bead dispenser, generally indicated at 32. The bead dispenser 32 is positioned directly behind the paint gun 24 and is adapted to distribute a uniform supply of glass beads onto the freshly applied paint stripe during the striping operation. The bead dispenser 32 is continuously supplied with the glass beads and for this purpose communicates with the bead receptacle 20 through a flexible conduit 34. The bead dispenser is adapted to be air-operated for instantaneous control, as will be described hereinafter, and further communicates with a source of air pressure through an air line 36 operatively connected thereto, the air line 36 communicating wkith the flexible air hose 27 through the T coupling.

It is understood that the operator of the striping machine controls the operation thereof so that the machine is propelled along the road to be marked at a relatively low rate of speed, the direction of travel being in the direction of the arrow shown in Fig. 1. As the machine moves along the surface of the road, the paint gun 24 applies a paint stripe thereon and immediately thereafter glass beads are dispensed by the bead dispenser 32 on the freshly applied paint stripe.

Referring now to Figs. 2-7, the glass bead dispenser 32 embodied in the present invention is illustrated and includes a central housing 40 that has a dispensing chamber 41 formed therein. Mounted on the central housing 40 and secured thereto by suitable bolts 42 is an upper housing 44. The central housing 40 has a recess 43 formed in the upper end over which is positioned a diaphragm 45, the operation of which will be described hereinafter. The diaphragm 45 cooperates with a recess formed in the upper housing 44 to define an upper chamber 46 which is adapted to receive operating air therein for causing movement of the diaphragm 62. Extending into the upper chamber 46 through an opening formed in the upper housing wall 47 is a hollow shaft 48 that is connected to the air line 36. As described above, the air line 36 is connected to a source of air pressure that supplies the air for operating the bead dispenser. The hollow shaft 48 is secured to a movable cup member 50 by an adjustment nut 52 and extends through an inner gland nut 54. The inner gland nut 54 is threadedly mounted in neck portion 55 that is integrally formed on the upper housing wall 47. The gland nut 54 engages a packing assembly 56 that is seated within the neck portion 55 and that further engages the shaft 48 in sealing relation therewith. It is seen that the shaft 48, adjustment nut 52 and cup member 50 are movable with respect to the gland nut 54 and upper housing 44 and as described below will be moved upon the introduction of air under pressure through the hollow shaft 48 and into contact with the diaphragm 45. In order to normally restrain the shaft 48 and cup member 50 against downward movement, a coil spring 58 is provided and is positioned within the cup member 50, encircling the shaft 48 and bearing against the upper end of the gland nut 54.

In order to introduce the operating air into the upper chamber 46, the hollow shaft is formed with a plurality of ports 60 at the lower end thereof which communicate with the chamber 46 and are thus adapted to supply the operating air thereto. Defining the lower end of the chamber 46 is the diaphragm 45, the outer edge of which is disposed between the upper housing 44 and the central housing 40, thereby securing the diaphragm in position. The diaphragm 45 is mounted between reinforcing discs 64 and 66 through which extend a lower threaded portion 68 of the shaft 48. The discs 64, 66 are positioned between a shoulder 67 formed on the lower end of the hollow shaft 48 and an upper face 69 of a square-shaped upper end 70 of a valve stem 72. The upper end 70 of the valve stem 72 threadably receives the threaded portion 68 of the shaft 48 and thus is operatively secured to the shaft 48 and diaphragm 45. As shown in Fig. 5, the square-shaped upper end 70 of the valve stem 72 extends through a square opening 74 formed in a partition 76 separating the central housing recess 43 and the dispensing chamber 41. A suitable gasket and washer assembly receives the upper end 70 therein and is secured to the partition 76 by bolts 78. Joined to the central housing 40 is a tube 79 that defines a bead inlet port 80 communicating with the dispensing chamber 41. The tube 79 is secured to the flexible conduit 34 and thus communicates with the glass bead receptacle 20. It is seen that glass beads are continuously fed to the dispensing chamber 41 through the conduit 34 and tube 79 since the bead receptacle 20 is located at an elevation somewhat higher than the dispensing chamber 41.

In order to control the flow of the glass beads through the port 80 and into the dispensing chamber 41, a frusto conical distributing valve 82 is provided and is threadedly secured to the valve stem 72. The distribuating valve 82 is normally urged into sealing engagement with a grommet 84 that is secured to an adjustment plate 86. The grommet opening provides an inlet for the glass beads for distribution into a bead dispensing shroud 88, the shroud 88 being securely mounted on the lower end of the central housing 40 by bolts that extend into an annular groove 89 formed in the outer wall of the housing 40. The adjustment plate 86 is secured to the housing 40 by bolts 90 that extend through enlarged openings 91 formed in the plate 86. The difference in diameter of the openings 91 and the bolts 90 defines the adjustment space for the plate 86 and enables the grommet 84 to be shifted laterally to compensate for eccentricities that may be formed in the grommet opening after a period of use. In order to laterally shift the grommet carrying adjustment plate 86, an adjustment nut 92 threadably engaging a threaded opening 93 is provided, which opening is formed in the body of the housing 40. An opening 95 is formed in the wall of the shroud 88 and provides access to the adjustment nut 92.

It is seen that upon movement of the diaphragm 45 in response to pressure of air thereon, the distributing valve 82 will be forced downwardly out of engagement with the grommet 92, thereby providing for flow of the glass beads into the interior of the shroud 88. The conical shape of the valve 82 causes the small glass beads to fall outwardly toward the wall of the shroud and to be evenly distributed onto the surface being marked, as will be more fully described hereinafter.

Extending downwardly from the distributing valve 82 and integrally joined to the valve stem 72 is a lower valve stem 94. The lower valve stem 94 is journalled in a bearing 96 located centrally of a spider 98 that is formed as an integral portion of the shroud 88. It is seen that by journalling the lower valve stem 94 in the bearing 96 and extending the square upper shaft 70 of the valve stem 72 through the square opening 74, formed in the partition 76, a relatively rigid structure is obtained whereby the valve stems will be free of side play and the distributing valve 82 will always be maintained in close sealing engagement in the grommet 84 in the closed position of the valve. Since side movement of the distributing valve 82 is prevented, it is seen that the grommet 84 is thus normally prevented from becoming eccentric with respect to the distributing valve which could result in unnecessary loss of the glass beads and inefficiency in the bead dispensing operation. However, should the opening in the grommet 84 become eccentric after a period of use of the device, the adjustment plate 86 may be shifted laterally to compensate for wear in the grommet opening. As shown in Figs. 4, 6 and 7, the spider 98 defines a partition that divides the shroud 88 into a front and rear section. During the bead dispensing operation, the glass beads drop through the opening 84 when the distributing valve 82 is moved to an open position, and are projected outwardly by the conical formation of the valve, falling into either the front or rear section of the shroud 88 and then dropping onto the freshly applied paint stripe in an even distribution. As shown in Fig. 6, the top of the spider 98 is rounded, thus enabling the descending glass beads to roll easily to one side or the other thereof upon contact therewith. As the striping machine is moved in a forwardly direction, the beads will thus be evenly distributed on both sides of the spider 98 and dispensed from the shroud 88 in a uniform distribution.

In operation of the bead dispenser embodied herein, the shaft 48 is secured to the air conduit 36 for controlling the operation of the diaphragm valve, and the glass bead inlet tube 79 is secured to the flexible conduit 34 for receiving the glass beads therein. The glass beads normally gravitate through the port 80 into the dispensing chamber 41. In the striping operation, the operator of the striping machine controls a suitable valve operatively connected to the air supply line that provides for the introduction of air through the air conduit 36 and into the hollow shaft 48. The air under pressure then forces the diaphragm 62 downwardly against the action of the spring 58, moving the conical distributing valve 82 out of engagement with the grommet 84 to allow the beads to drop through the opening in the grommet and strike the conical surface of the distributing valve. The beads are deflected outwardly toward the wall of the shroud 88 and fall on both sides of the spider 98, being uniformly distributed on the freshly painted stripe applied by the paint gun 24.

It is seen that by providing a diaphragm valve as shown and described, the bead dispenser is relatively short and may be positioned in striping machines where it is necessary to locate the bead dispenser in close proximity to the ground. The diaphragm provides a very close control of the distributing valve 82 and is responsive to the application of air thereto to cause instantaneous movement of the distributing valve 82. By providing the coil spring 58, the distributing valve 82 is normally retained in a closed position and will be biased to the closed position when the air pressure on the diaphragm 62 is removed. The tension on the coil spring may be easily varied by the cup member 50, thereby varying the movement of the distributing valve. The limit of movement of the distributing valve is then determined by the position of the cup member with respect to the upper housing. By providing a close control of the movement of the valve, an even distribution of the beads is effected. Moreover, by journalling the lower valve stem 94 in the spider 98 and extending the upper end of the stem 72 through a square opening, movement of the valve will always be in a vertical direction and possibility of deforming the grommet 84 is avoided. Should the grommet become deformed after some period of use, the adjustment plate 86 may be shifted laterally by the adjustment nut 92 to reposition the grommet until the valve 82 is positively seated therein. Loss of beads is thereby prevented and an even and uniform distribution of the beads is assured at all times. Since the glass beads fall by gravity onto the conical distributing valve and are deflected outwardly thereby, the shroud 88 will limit the outward distribution of the beads and a definite bead distributing pattern is achieved. Furthermore, the beads will not be thrown outwardly against the shroud wall and be deflected inwardly thereof to cause a non-uniform bead distribution.

It is seen that the striping apparatus using the above-described bead dispenser may be propelled at various speeds depending upon the speed of operation demanded by the striping conditions and the glass beads will always be uniformly distributed on the surface being marked.

It will be obvious to those skilled in the art that various changes may be made without departing from the spirit of the invention and therefore the invention is not limited to what is shown in the drawings and described in the specification but only as indicated in the appended claims.

What is claimed is:

1. In a highway marking machine for distributing reflective glass beads upon a surface, a mobile support, a housing mounted on said support and having an upper and lower chamber formed therein, said lower chamber communicating with a source of glass beads, a hollow air inlet shaft extending through said housing into said upper chamber and having inlet ports formed in the portion positioned in said upper chamber, said hollow shaft communicating with a source of air pressure, a diaphragm disposed in said upper chamber, said diaphragm being secured to said shaft for movement therewith, a bead confining shroud secured to said housing and depending therefrom, an opening formed in the upper wall of said shroud providing communication between said shroud and lower chamber, a valve disposed in said opening and adapted to normally close off communication between said lower chamber and shroud interior, a valve stem secured to said valve and extending upwardly therefrom being operatively secured to said shaft and diaphragm for movement therewith, and resilient means operatively associated with said valve for urging said valve to a closed position, said diaphragm being responsive to air pressure thereon to move said valve from the normally closed position to an open position against the action of said resilient means, said glass beads thereby being dispensed from said lower chamber into said shroud and onto said surface.

2. In a highway marking machine as set forth in claim 1, wherein said shroud has a frame member joined to the interior thereof, said frame member receiving the lower end of said valve stem in bearing relation and separating said shroud interior into front and rear sections, said beads striking said frame member during the dispensing operation and being distributed in a uniform pattern onto said surface.

3. In a highway marking machine as set forth in claim 2, wherein a portion of said valve stem is formed square in cross-section, said square portion extending through a square opening formed in a partition dividing said chambers, said square portion and frame member cooperating to prevent side play of said valve stem.

4. In a highway marking machine for distributing reflective glass beads upon a surface, a mobile support, a housing mounted on said support and having an upper and lower chamber formed therein, said lower chamber communicating with a source of glass beads, a hollow air inlet shaft extending through the upper end of said housing into said upper chamber and having inlet ports formed therein, a diaphragm disposed in said upper chamber and engaging said shaft, a valve stem operatively connected to said diaphragm and said shaft and extending through said lower chamber, a bead confining shroud secured to said housing and depending therefrom, an opening defining a valve seat formed in the upper wall of said shroud and providing communication between the interior of said shroud and said lower chamber, a valve normally urged into contact with said valve seat and secured to said valve stem, and means for urging said valve into contact with said seat, said urging means including a member secured to said shaft and movable therewith, and a spring engaging said member at one end and a fixed member at the other end, said diaphragm being flexed in response to air pressure thereon to move said valve out of engagement with said seat against the action of said spring, said beads thereby being dispensed into said shroud and onto said surface.

5. In a highway marking machine as set forth in claim 4, wherein said shroud has a spider joined to the interior thereof defining a bearing for receiving the lower end of said valve stem therein, the upper end of said valve stem being square in cross-section and extending through a square opening formed in a partition dividing said upper and lower chambers, said valve stem thereby being supported at both ends for preventing side play thereof.

6. In a highway marking machine as set forth in claim 5, wherein said spider divides said shroud into a front and rear section and has a rounded top configuration, said beads striking said spider and rolling over said rounded top configuration into either said front or rear section for uniform distribution onto said surface.

7. In a highway marking machine for distributing glass beads upon a surface, a mobile support, a housing mounted on said support and having an upper and lower chamber formed therein, said lower chamber communicating with a source of glass beads, an air inlet shaft extending through said housing into said upper chamber and having air inlet ports formed therein, said air shaft communicating with a source of air pressure, a diaphragm disposed in said upper chamber, said diaphragm being secured to said shaft for movement therewith, a bead confining shroud secured to said housing and depending therefrom, a plate adjustably secured to the lower end of said housing and defining a wall between said lower chamber and shroud, a grommet secured in said adjustable plate, a valve normally seated in said grommet and closing off communication between said lower chamber and shroud interior, a valve stem secured to said valve and extending upwardly therefrom being operatively connected to said shaft and diaphragm for movement therewith, resilient means associated with said valve for urging said valve to a closed position, said diaphragm being responsive to air pressure thereon to move said valve from a normally closed position to an open position against the action of said resilient means, said glass beads thereby being dispensed from said lower chamber into said shroud and onto said surface.

8. In a highway marking machine as set forth in claim 7, which includes means for laterally shifting said adjustable plate, said grommet thereby being shifted laterally to reposition the portion defining the valve seat with respect to said valve.

9. In a highway marking machine for distributing glass beads upon a surface, a mobile support, a housing mounted on said support and having an upper and lower chamber formed therein, a diaphragm disposed in said upper chamber, a valve stem secured to said diaphragm and extending through said lower chamber and into said upper chamber, a glass bead inlet communicating with the interior of said lower chamber, a glass bead discharge opening formed in the lower end of said lower chamber, a conical valve secured to said valve stem and normally seated in said opening, a hollow shaft extending through the upper end of said housing and into said upper chamber, said hollow shaft being operatively connected to said valve stem and diaphragm in coaxial relation and for movement therewith, air discharge openings formed in the lower end of said hollow shaft adjacent the upper surface of said diaphragm, resilient means operatively associated with said valve for urging said valve to a closed position, said hollow shaft communicating with a source of air under pressure, said air under pressure being introduced into said upper chamber through said hollow shaft and air openings and into contact with said diaphragm to flex said diaphragm downwardly thereby moving said valve stem downwardly and unseating said valve from said bead discharge opening.

10. In a highway marking machine for distributing glass beads upon a surface, a mobile support, a housing mounted on said support and having an upper and lower chamber formed therein, a diaphragm disposed in said upper chamber, a valve stem secured to said diaphragm and extending through said lower chamber and into said upper chamber, means communicating with the interior of said lower chamber for introducing glass beads therein, said lower chamber having a discharge opening formed therein, a valve secured to said valve stem and normally seated in said opening, a hollow shaft secured to said valve stem and diaphragm in coaxial relation and movable therewith, said hollow shaft extending through said housing and communicating with a source of air under pressure, air inlet means formed in said hollow shaft and adapted to direct said air under pressure into contact with the upper surface of said diaphragm, said diaphragm being flexed downwardly in response to said air under pressure thereby moving said valve stem downwardly to unseat said valve from said discharge opening.

11. In a highway marking machine for distributing glass beads upon a surface, a mobile support, a housing mounted on said support and having an upper and lower chamber formed therein, said lower chamber including means communicating with a source of glass beads, a hollow air inlet shaft extending through said housing into said upper chamber and having air inlet ports formed therein, said inlet shaft, communicating with a source of air under pressure, a diaphragm disposed in said upper chamber and secured to said shaft for movement therewith, a discharge opening formed in the lower portion of said housing and communicating with said lower chamber, a valve disposed in said opening, a valve stem secured to said valve, extending upwardly therefrom and operatively connected to said diaphragm and shaft for movement therewith, means operatively associated with said valve for urging said valve into a normally closed position, said diaphragm being responsive to air under pressure directed thereto through said hollow shaft to move said valve from a normally closed position to an open position, said glass beads thereby being dispensed from said lower chamber and onto said surface.

12. In a highway marking machine for dispensing particles upon a surface, a mobile support, a housing mounted on said support, means formed on said housing communicating with a source of said particles for directing said particles to the interior of said housing, an air inlet shaft extending through the upper end of said housing and communicating with a source of air under pressure, air inlet ports formed on the lower end of said air inlet shaft, a diaphragm disposed in said housing and secured to said shaft for movement therewith, a discharge opening formed in the lower end of said housing, a valve seated in said opening in a normally closed position, a valve stem secured to said valve and operatively connected to said diaphragm and said shaft for movement therewith, means operatively associated with said air inlet shaft, diaphragm, valve stem and valve for urging said valve to a normally closed position, said diaphragm being responsive to said air under pressure directed thereto through said hollow shaft to move said valve from a normally closed position to an open position.

13. In a highway marking machine for distributing reflective glass beads upon a surface, a mobile support, a housing mounted on said support and having an upper and lower chamber formed therein, said lower chamber communicating with a source of glass beads, a hollow air inlet shaft extending through said housing into said upper chamber and having inlet ports formed in the portion positioned in said upper chamber, said hollow shaft communicating with a source of air pressure, a diaphragm disposed in said upper chamber, said diaphragm being secured to said shaft for movement therewith, a bead confining shroud secured to said housing and depending therefrom, an opening formed in the upper wall of said shroud providing communication between said shroud and lower chamber, a valve disposed in said opening and adapted to normally close off communication between said lower chamber and shroud interior, a valve stem secured to said valve and extending upwardly therefrom being operatively secured to said shaft and diaphragm for movement therewith, said diaphragm being responsive to air pressure thereon to move said valve from the normally closed position to an open position, said glass beads thereby being dispensed from said lower chamber into said shroud and onto said surface, means for normally urging said valve into a closed position, said urging means including a cup-shaped member secured to said shaft and movable therewith, and a spring disposed within said cup-shaped member and encircling said shaft, said spring bearing against a fixed member at one end and said cup-shaped member at the other end.

References Cited in the file of this patent

UNITED STATES PATENTS

| | | |
|---|---|---|
| 1,589,998 | Stoetzel | June 22, 1926 |
| 2,526,735 | Duce | Oct. 24, 1950 |
| 2,546,702 | Ready | Mar. 27, 1951 |
| 2,616,744 | Wolford | Nov. 4, 1952 |
| 2,641,476 | Keleher | June 9, 1953 |
| 2,673,090 | Blumberg | Mar. 23, 1954 |
| 2,691,358 | Peck | Oct. 12, 1954 |
| 2,752,941 | Mitchell | July 3, 1956 |